(12) United States Patent
Cheng et al.

(10) Patent No.: US 9,151,643 B2
(45) Date of Patent: Oct. 6, 2015

(54) MEASURING APPARATUS AND CONTROLLING METHOD THEREOF

(71) Applicant: SHENZHEN CHINA STAR OPTOELECTRONICS TECHNOLOGY CO., LTD., Shenzhen, Guangdong (CN)

(72) Inventors: Wen-da Cheng, Guangdong (CN); Chinlung Tsai, Guangdong (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 380 days.

(21) Appl. No.: 13/810,212

(22) PCT Filed: Nov. 8, 2012

(86) PCT No.: PCT/CN2012/084303
§ 371 (c)(1),
(2) Date: Jan. 15, 2013

(87) PCT Pub. No.: WO2014/059712
PCT Pub. Date: Apr. 24, 2014

(65) Prior Publication Data
US 2014/0182400 A1 Jul. 3, 2014

(30) Foreign Application Priority Data
Oct. 19, 2012 (CN) .......................... 2012 1 0401287

(51) Int. Cl.
*G01D 11/30* (2006.01)
*G01B 21/04* (2006.01)
(Continued)

(52) U.S. Cl.
CPC .............. *G01D 11/30* (2013.01); *G01B 5/0002* (2013.01); *G01B 21/047* (2013.01); *G02F 1/1303* (2013.01); *G02F 1/1309* (2013.01)

(58) Field of Classification Search
CPC .... G01B 21/047; G01B 5/0002; G01D 11/30; G03F 7/709; F16F 15/0275; F16F 15/02
USPC .............................................. 73/866.5; 356/2
See application file for complete search history.

(56) References Cited
U.S. PATENT DOCUMENTS 4,477,045 A * 10/1984 Karasawa et al. .............. 248/694
5,060,519 A * 10/1991 Chojitani et al. ............... 73/662
(Continued)

FOREIGN PATENT DOCUMENTS

CN 1480787 A 3/2004
JP 2005-55207 3/2005

OTHER PUBLICATIONS

1st Office Action of counterpart Chinese Patent Application No. 201210401287.X issued on Oct. 23, 2014.
(Continued)

Primary Examiner — Hezron E Williams
Assistant Examiner — David Z Huang

(57) ABSTRACT

The present disclosure provides a measuring apparatus including a platform, a measuring head movably arranged on the platform, pneumatic balls supporting the platform, an inflator, and a controlling device controlling the inflator to inflate the pneumatic balls while the measuring head is moving towards a next measuring point from a current measuring point. The controlling device controls the inflator to inflate the pneumatic balls with the required air inflation amount within the required time evenly during the movement of the measuring head, therefore, the vibration of the platform during the movement of the measuring head and the inflation of the pneumatic ball can be reduced, which can keep the platform horizontal quickly after the measuring head stops moving, reduce the measurement errors of the measuring head, further improve the productivity of the liquid crystal panel. The present disclosure further provides a controlling method of the above measuring apparatus.

13 Claims, 3 Drawing Sheets

(51) Int. Cl.
*G01B 5/00* (2006.01)
*G02F 1/13* (2006.01)

(56) References Cited

U.S. PATENT DOCUMENTS

| | | | |
|---|---|---|---|
| 5,285,995 A * | 2/1994 | Gonzalez et al. | 248/550 |
| 5,876,012 A * | 3/1999 | Haga et al. | 248/550 |
| 5,881,987 A * | 3/1999 | Hara | 248/550 |
| 6,021,991 A * | 2/2000 | Mayama et al. | 248/550 |
| 6,213,442 B1 * | 4/2001 | Ivers et al. | 248/550 |
| 2003/0019119 A1 * | 1/2003 | Sato et al. | 33/503 |
| 2009/0224777 A1 * | 9/2009 | Kim et al. | 324/750 |

OTHER PUBLICATIONS

International Search Report issued for PCT application No. PCT/CN2012/084303 by the State Intellectual Property Office of China.

\* cited by examiner

MEASURING APPARATUS AND CONTROLLING METHOD THEREOF

BACKGROUND

1. Technical Field

The present disclosure relates to technologies of liquid crystal panel and, particularly, to a measuring apparatus used for measuring a liquid crystal panel during a manufacturing process of the liquid crystal panel and a controlling method for controlling the measuring apparatus.

2. Description of Related Art

At present, after a liquid crystal panel is manufactured, a measuring apparatus is often used for optically measuring the liquid crystal panel to determine whether the liquid crystal panel has defects about optical displaying. The present measuring apparatus, especially the measuring apparatus for measuring large liquid crystal panels, is often very large, and a platform of the measuring apparatus for supporting the liquid crystal panel is correspondingly large. As shown in FIG. 1, a present measuring apparatus 80 includes a platform 81 for supporting a liquid crystal panel, a measuring head 82 for optically scanning the liquid crystal panel, supporting posts 84, and pneumatic balls 83 respectively arranged on the supporting posts 84 for supporting the platform 81. The measuring head 82 is arranged above the platform 81 and is capable of moving relative to the platform 81 to optically scan the liquid crystal panel. The pneumatic balls 83 are arranged under the platform 81 and can be filled with air so as to support the platform 81 and keep the platform 81 balanced.

Before the measuring apparatus 80 is used, each pneumatic ball 83 is inflated for keeping the platform 81 balanced according to the location of center of gravity of the platform 81 and the measuring head 82 as a whole. Thus, the liquid crystal panel can be kept horizontal after being placed on the platform 81, allowing the measuring head 82 to optically scan the liquid crystal panel conveniently. When the measuring apparatus 80 begins to work, the measuring head 82 begins to move relative to the platform 81 to measure predetermined measuring points on the liquid crystal panel. During the movement of the measuring head 82, the location of the center of gravity of the platform 81 and the measuring head 82 as a whole changes, and the pneumatic balls 83 detects pressure and is compressed when the center of gravity of the platform 81 and the measuring head 82 as a whole moves to the corresponding location, causing the platform 81 to incline towards one end thereof corresponding to the measuring head 82.

For example, when the measuring head 82 moves to a location corresponding to the pneumatic ball 83b from a location corresponding to the pneumatic ball 83a as shown in FIG. 1, the center of gravity of the platform 81 and the measuring head 82 as a whole moves to correspond to the pneumatic ball 83b due to the movement of the measuring head 82, thus, the pneumatic ball 83b is compressed under the platform 81 and the measuring head 82, causing one end of the platform corresponding to the pneumatic ball 83b to descend. After the pneumatic ball 83b is compressed, an inflator (not shown in the drawing) is used for inflating the pneumatic ball 83b to gradually increase the volume of the pneumatic ball 83b. At the same time, a sensor arranged in the pneumatic ball 83b detects the amount of the air inflated thereinto and outputs a feedback signal to the inflator if the air amount in the pneumatic ball 83b reaches a predetermined value. The inflator stops inflating the corresponding pneumatic ball 83 after receiving the feedback signal. The inflated pneumatic ball 83 has a predetermined volume and is capable of supporting the platform 81 to keep the platform 81 horizontal again. However, during the process, since the inflator inflates the corresponding pneumatic ball 83 after the pneumatic ball 83 is compressed and after one end of the platform 81 descends, thus, the corresponding end of the platform 81 ascends after descends, which results in measurement errors of the measuring head 82 and further affects the measuring efficiency of the liquid crystal panel. Additionally, it takes a longer time to keep the platform 81 balanced by inflating the corresponding pneumatic ball 83 after the measuring head 82 moves to the corresponding measuring location, which lowers the productivity of the liquid crystal panel.

SUMMARY

The present disclosure provides a measuring apparatus for measuring a liquid crystal panel which can avoid a variation of a platform and measurement errors in the measuring process of the liquid crystal panel caused by the reason that the inflator inflates the corresponding pneumatic ball after the measuring head moves towards the predetermined measuring position.

The measuring apparatus includes a platform, a measuring head movably arranged on the platform, a plurality of pneumatic balls configured for supporting the platform, an inflator, and a controlling device configured for controlling the inflator to inflate a corresponding pneumatic ball while the measuring head is moving towards a next measuring point from a current measuring point.

Preferably, the controlling device includes an obtaining unit configured for obtaining an air inflation amount required to be inflated into the corresponding pneumatic ball after the measuring head moves to the next measuring point and obtaining a time required for the measuring head to move to the next measuring point from the current measuring point according to a moving speed of the measuring point and a distance between the current measuring point and the next measuring point.

Preferably, the controlling device further includes a controlling unit for controlling the inflator to inflate the corresponding pneumatic ball evenly with the required air inflation amount within the required time.

Preferably, the controlling device further includes a detecting unit and a timing unit, the detecting unit is connected to the measuring head and the controlling unit for outputting a detecting signal when the measuring head begins to move towards the next measuring point from the current measuring point; the timing unit is connected to the detecting unit, the pneumatic balls, and the controlling unit for accumulating time after receiving the detecting signal and for outputting a controlling signal when the accumulated time reaches the required time; the controlling unit controls the inflator to inflate the corresponding pneumatic ball after receiving the detecting signal and controls the inflator to stop inflating the corresponding pneumatic ball after receiving the controlling signal.

Preferably, the controlling device further includes a calculating unit configured for calculating an air inflation rate at which the inflator inflates the corresponding pneumatic ball according to the required time and the required air inflation amount, and the controlling unit controls the inflator to inflate the corresponding pneumatic ball at the air inflation rate after receiving the detecting signal.

Preferably, a sensor connected to the obtaining unit is arranged in each pneumatic ball, the sensor is used for detecting an air amount in the corresponding pneumatic ball and outputting a stop signal when the air amount in the corresponding pneumatic ball reaches the required air inflation amount; the controlling device includes a detecting unit, a calculating unit, and a controlling unit; the detecting unit is connected to the measuring head and the controlling unit for outputting a detecting signal when the measuring head begins to move towards the next measuring point from the current measuring point, the calculating unit is configured for calculating an air inflation rate at which the inflator inflates the corresponding pneumatic ball according to the required air inflation amount and the required time, the controlling unit is connected to the inflator and the sensor for controlling the inflator to inflate the corresponding pneumatic ball at the air inflation rate after receiving the detecting signal and controlling the inflator to stop inflating the corresponding pneumatic ball after receiving the stop signal.

The present disclosure further provides a controlling method of a measuring apparatus which includes a platform, a measuring head movably arranged on the platform, and a plurality of pneumatic balls for supporting the platform, including:

moving the measuring head such that the measuring head can move from a current measuring point towards a next measuring point; and controlling an inflator to inflate the corresponding pneumatic ball during the movement of the measuring head.

Preferably, the step of controlling an inflator to inflate the corresponding pneumatic ball during the movement of the measuring head includes:

obtaining an air inflation amount required to be inflated into the corresponding pneumatic ball;

obtaining a position of the current measuring point and obtaining a time required for the measuring point to move to the next measuring point from the current measuring point according to a moving speed of the measuring head and a distance between the current measuring point and the next measuring point; and controlling the inflator to inflate the corresponding pneumatic ball with the required air inflation amount within the required time.

Preferably, the step of controlling the inflator to inflate the corresponding pneumatic ball according to the required air inflation amount and the required time includes:

outputting a detecting signal when the measuring head begins to move towards the next measuring point from the current measuring point;

calculating an air inflation rate at which the inflator inflates the corresponding pneumatic ball according to the required air inflation amount and the required time;

turning on the inflator after receiving the detecting signal such that the inflator can inflate the corresponding pneumatic ball at the air inflation rate;

accumulating time after receiving the detecting signal and outputting a controlling signal after the accumulated time reaches the required time; and controlling the inflator to stop inflating the corresponding pneumatic ball after receiving the controlling signal.

Preferably, the step of controlling the inflator to inflate the corresponding pneumatic ball according to the required air inflation amount and the required time includes:

outputting a detecting signal when the measuring head begins to move towards the next measuring point from the current measuring point;

calculating an air inflation rate which the inflator inflates the corresponding pneumatic ball according to the required air inflation amount and the required time;

turning on the inflator after receiving the detecting signal such that the inflator can inflate the corresponding pneumatic ball at the air inflation rate;

controlling a sensor in each pneumatic ball to detect an air amount in the corresponding pneumatic ball and to output a stop signal when the air amount in the corresponding pneumatic ball reaches the required air inflation amount; and controlling the inflator to stop inflating the corresponding pneumatic ball after receiving the stop signal.

The present disclosure further provides another controlling method of a measuring device which includes a platform, a measuring head movably arranged on the platform, and a plurality of pneumatic balls for supporting the platform, including:

moving the measuring head such that the measuring head can move from a current measuring point towards a next measuring point;

obtaining an air inflation amount required to be inflated into the corresponding pneumatic ball;

obtaining a time required for the measuring head to move towards the next measuring point from the current measuring point; and controlling an inflator to inflate the corresponding pneumatic ball with the required air inflation amount within the required time during the movement of the measuring head.

Preferably, the step of controlling an inflator to inflate the corresponding pneumatic ball with the required air inflation amount within the required time during the movement of the measuring head includes:

outputting a detecting signal when the measuring head begins to move towards the next measuring point from the current measuring point;

turning on the inflator after receiving the detecting signal such that the inflator can inflate the corresponding pneumatic ball and beginning to accumulate time, and outputting a controlling signal when the accumulated time reaches the required time; and controlling the inflator to stop inflating the corresponding pneumatic ball after receiving the controlling signal.

Preferably, the controlling method further includes the following step after the step of outputting a detecting signal when the measuring head begins to move towards the next measuring point from the current measuring point:

calculating the air inflation rate at which the inflator inflates the corresponding pneumatic ball according to the required air inflation amount and the required time;

and the step of turning on the inflator after receiving the detecting sign such that the inflator can inflate the corresponding pneumatic ball is:

turning on the inflator after receiving the detecting signal such that the inflator can inflate the corresponding pneumatic ball at the air inflation rate and beginning to accumulate time and outputting a controlling signal when the accumulated time reaches the required time.

Preferably, the step of controlling an inflator to inflate the corresponding pneumatic ball with the required air inflation amount within the required time during the measuring head moves includes:

outputting a detecting signal when the measuring head begins to move towards the next measuring point from the current measuring point;

turning on the inflator after receiving the detecting signal such that the inflator can inflate the corresponding pneumatic ball;

controlling a sensor in each pneumatic ball to detect an air amount in the corresponding pneumatic ball and output a stop signal when the air amount in the corresponding pneumatic ball reaches the required air inflation amount; and controlling the inflator to stop inflating the corresponding pneumatic ball after receiving the stop signal.

Preferably, the controlling method further includes the following step after the step of outputting a detecting signal when the measuring head begins to move towards the next measuring point from the current measuring point:

calculating an air inflation rate at which the inflator inflates the corresponding pneumatic ball according to the required air inflation amount and the required time;

and the step of turning on the inflator after receiving the detecting signal such that the inflator can inflate the corresponding pneumatic ball is:

turning on the inflator after receiving the detecting signal such that the inflator can inflate the corresponding pneumatic ball at the air inflation rate.

With the controlling device, the measuring apparatus of the present disclosure is capable of obtaining the time required for the measuring head to move to the next measuring point from the current measuring point can be obtained according to the moving speed of the measuring head and the distance between two adjacent measuring points and is capable of controlling the inflator to inflate the corresponding pneumatic ball with the required air inflation amount within the required time evenly. Since the inflator inflates the corresponding pneumatic ball during the movement of the measuring head, the vibration of the platform occurred during the movement of the measuring head and the inflation of the pneumatic ball can be reduced, which can keep the platform horizontal quickly after the measuring head stops moving, reduce the measurement errors of the measuring head, and further improve the productivity of the liquid crystal panel.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
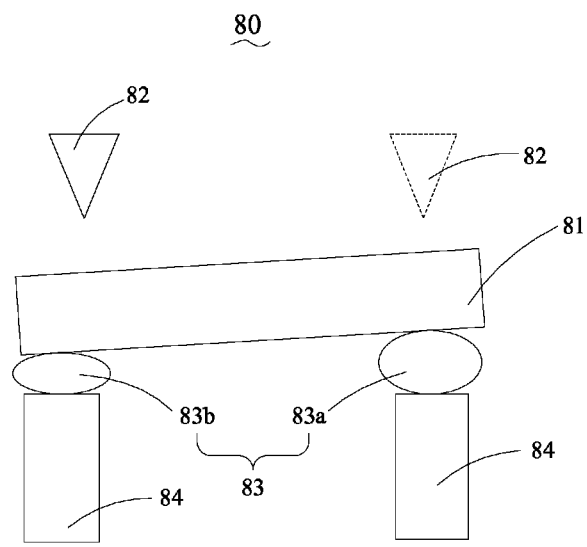
FIG. 1 is a schematic view illustrating a present measuring apparatus used for measuring a liquid crystal panel.
Figure 2:
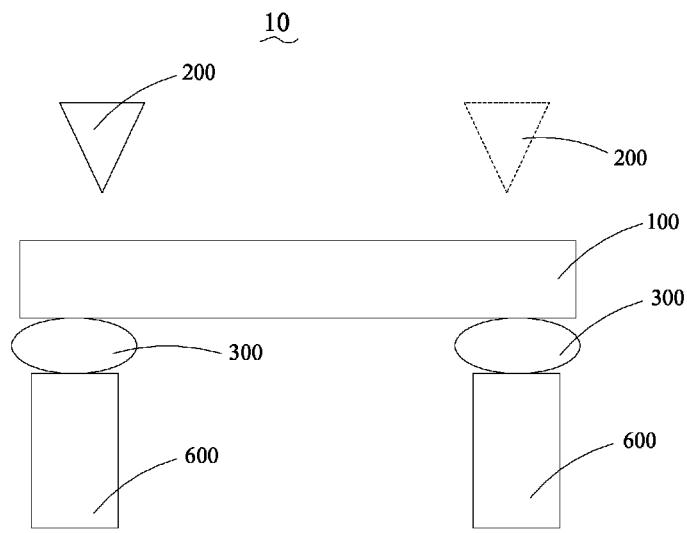
FIG. 2 is a schematic view illustrating a measuring apparatus in accordance with an embodiment of the present disclosure.

Referring to FIG. 2, which is a schematic view of a measuring apparatus 10 in accordance with an embodiment of the present disclosure. The measuring apparatus 10 is used for optically measuring a liquid crystal panel, including a platform 100, a measuring head 200, a number of supporting columns 600, and a number of pneumatic balls 300. The platform 100 is used for supporting the liquid crystal panel. The measuring head 200 is arranged above the platform 100 and is capable of moving relative to the platform 100 to optically scan a number of measuring points of the liquid crystal panel. The pneumatic balls 300 are arranged on the supporting columns 600 and located under the platform 100 for supporting the platform 100 and keeping the platform 100 horizontal.

Figure 3:
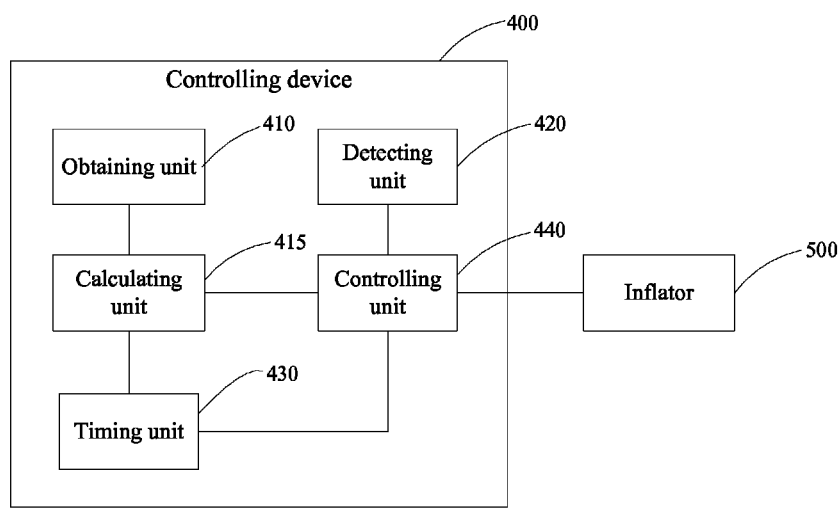
FIG. 3 is a schematic view of a controlling device and an inflator of the measuring apparatus of FIG. 2.

The measuring apparatus 10 further includes a controlling device 400 and an inflator 500. Referring to FIG. 3, which is a schematic view of the controlling device 400 and the inflator 500. The controlling device 400 is connected to the measuring head 200, the pneumatic balls 300, and the inflator 500 and is configured for obtaining air inflation amount required to be inflated into the corresponding pneumatic ball 300 and controlling the inflator 500 to inflate the corresponding pneumatic ball 300 with the required air inflation amount.

Specifically, in the embodiment, the controlling device 400 includes an obtaining unit 410, a calculating unit 415, a detecting unit 420, a timing unit 430, and a controlling unit 440. The obtaining unit 410 is connected to the measuring head 200 for obtaining the position of the current measuring point where the measuring head 200 is located, obtaining a time required for the measuring head 200 to move to a next measuring point from the current measuring point according to a moving speed of the measuring head 200 and a distance between the current measuring point and the next measuring point, and obtaining the air inflation amount required to be inflated into the corresponding pneumatic ball 300 for keeping the platform 81 horizontal when the measuring head 200 is located at the next measuring point. In the embodiment, the moving speed of the measuring head 200 and the next measuring point are pre-determined. That is, when the measuring head 200 is measuring the liquid crystal panel at the current measuring point, the position of the next measuring point is determined by the system, thus, by obtaining the position of the current measuring point, the obtaining unit 410 can obtain the time required for the measuring head 200 to move to the next measuring point from the current measuring point according to the moving speed of the measuring head 200 and the distance between the current measuring point and the next measuring point. The obtaining unit 410 further obtains the air inflation amount required to be inflated into the corresponding pneumatic ball 300 for keeping the platform 100 horizontal after the measuring head 200 is located at the next measuring point.

The calculating unit 415 is connected to the obtaining unit 410 for receiving the required air inflation amount and the required time obtained by the obtaining unit 410, and for calculating an air inflation rate at which the inflator 500 inflates the corresponding pneumatic ball 300 according to the required air inflation amount and the required time. The detecting unit 420 is connected to the measuring head 200 for outputting a detecting signal when the measuring head 200 begins to move towards the next measuring point from the current point. It is understood that the detecting signal can be a signal which can be easily recognized such as a low-level signal or an infrared signal. The timing unit 430 is connected to the detecting unit 420 and the obtaining unit 410, and the timing unit 430 is used for receiving the required time obtained by the obtaining unit 410 for the measuring head 200 to move to the next measuring point from the current measuring point, and for setting the required time as the target time interval. The timing unit 430 begins to accumulate time after receiving the detecting signal. The timing unit 430 stops accumulating time and outputs a controlling signal when the accumulated time reaches the target time interval.

The controlling unit 440 is connected to the calculating unit 415, the detecting unit 420, the timing unit 430, and the inflator 500. The controlling unit 440 is configured for receiving the detecting signal from the detecting unit 420 and the controlling signal from the controlling unit 430. The controlling unit 440 turns on the inflator 500 after receiving the detecting signal such that the inflator 500 can inflate the corresponding pneumatic ball 300 at the air inflation rate calculated by the calculating unit 415. The controlling unit 440 turns off the inflator device 500 after receiving the controlling signal, so that the inflator 500 stops inflating the corresponding pneumatic ball 300. It is understood that if the detecting signal is a low-level signal, the controlling signal can be a high-level signal. Therefore, the timing unit 430 begins to accumulate time after receiving a low-level signal and stops accumulating time after receiving a high-level signal, and the controlling unit 440 turns on the inflator 50 after receiving the high-level signal.

Furthermore, in another embodiment, a sensor (not shown in the drawing) is configured in each pneumatic ball 300 for detecting the air amount in each pneumatic ball 300. Specifically, a number of sensors are respectively configured in the pneumatic balls 300 and are connected to the obtaining unit 410 and the controlling unit 440 of the controlling device 400. The sensor detects the air amount in the corresponding pneumatic ball 300 and determines whether the air amount therein reaches the required air inflation amount obtained by the obtaining unit 410. The sensor outputs a stop signal to the controlling unit 440 when air amount in the corresponding pneumatic ball 300 reaches the required air inflation amount. The controlling unit 440 turns on the inflator 500 after receiving the detecting signal such that the inflator 500 can inflate the corresponding pneumatic ball 300 with the required air inflation amount and turns off the inflator 500 after receiving the stop signal such that the inflator 500 can stop inflating the corresponding pneumatic ball 300. It is understood that if the detecting signal is a low-level signal, the stop signal output from each sensor can correspondingly be a high-level signal. At this time, the controlling unit 440 turns on the inflator 500 after receiving a low-level signal and turns off the inflator 500 after receiving a high-level signal.

The measuring apparatus 10 of the present disclosure is configured with a controlling device 400. With the configuration of the obtaining unit 410, the calculating unit 415, the detecting unit 420, the timing unit 430, and the controlling unit 440 of the controlling device 400, the time required for the measuring head 200 to move to the next measuring point from the current measuring point can be obtained according to the moving speed of the measuring head 200 and the distance between two adjacent measuring points; additional, the controlling unit 440 is capable of controlling the inflator 500 to inflate the corresponding pneumatic ball 300 with the required air inflation amount within the required time evenly. Since the inflator 500 inflates the corresponding pneumatic ball 300 during the movement of the measuring head 200, the vibration of the platform 100 occurred during the movement of the measuring head 200 and the inflation of the pneumatic ball 300 can be reduced, which can keep the platform 100 horizontal quickly after the measuring head 200 stops moving, reduce the measurement errors of the measuring head 200, and further improve the productivity of the liquid crystal panel.

The present disclosure further provides a controlling method for controlling the above measuring apparatus 10. Being controlled by the controlling method, the platform 100 of the measuring apparatus 10 can be restored to be horizontal after the measuring head 200 is located at the next measuring point to reduce the measurement errors of the measuring head 200 and improve the productivity of the liquid crystal panel.

Figure 4:
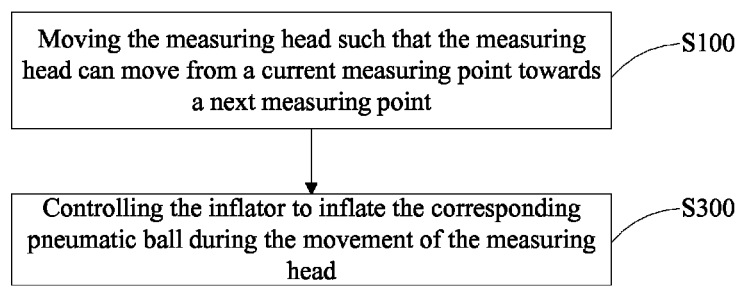
FIG. 4 is a flow chart of a controlling method of the measuring apparatus in accordance with an embodiment of the present disclosure.

Referring to FIG. 4, the controlling method includes:

Step S100, moving the measuring head 200 such that the measuring head 200 can move from a current measuring point towards a next measuring point. In the embodiment, a moving speed of the measuring head 200 and the next measuring point are pre-determined. That is, when the measuring head 200 is measuring the liquid crystal panel at the current measuring point, the position of the next measuring point is pre-determined by the system of the measuring apparatus 10. Thus, the measuring head 200 begins to move towards the next measuring point when the measurement of the current measuring point is finished.

Step S300, controlling the inflator 500 to inflate the corresponding pneumatic ball 300 during the movement of the measuring head 200. The controlling device 400 of the measuring apparatus 10 is connected to the measuring head 200, the pneumatic balls 300, and the inflator 500 for controlling the inflator 500 to inflate the corresponding pneumatic ball 300 while the measuring head 200 is moving towards the next measuring point from the current measuring point.

Figure 5:
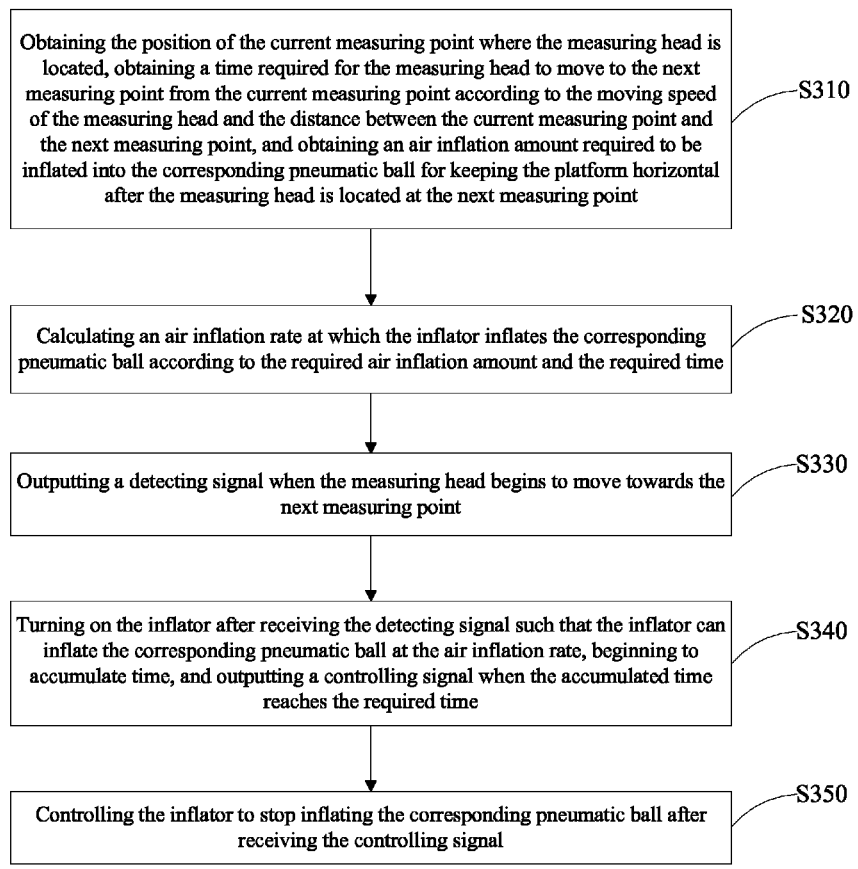
FIG. 5 is a flow chart of the step S300 of the controlling method of FIG. 4.

Referring to FIG. 5, specifically, the step S300 includes the following steps:

Step S310, obtaining the position of the current measuring point where the measuring head 200 is located, obtaining a time required for the measuring head 200 to move to the next measuring point from the current measuring point according to the moving speed of the measuring head 200 and the distance between the current measuring point and the next measuring point, and obtaining an air inflation amount required to be inflated into the corresponding pneumatic ball 300 for keeping the platform 100 horizontal after the measuring head 200 is located at the next measuring point. In the embodiment, the obtaining unit 410 of the controlling device 400 obtains the position of the current measuring point where the measuring head is located and calculates the time required for the measuring head 200 to moves to the next measuring point according to the pre-determined moving speed of the measuring head 200 and the distance between the current measuring point and the next measuring point. Meanwhile, the obtaining unit 410 obtains the air inflation amount required to be inflated to the corresponding pneumatic ball 300 for keeping the platform 100 horizontal when the measuring head 200 is located at the next measuring point.

Step S320, calculating an air inflation rate at which the inflator inflates the corresponding pneumatic ball according to the required air inflation amount and the required time. In the embodiment, the calculating unit 415 of the controlling device 400 receives the air inflation amount required to be inflated to the corresponding pneumatic ball 300 and the time required for the measuring head 200 to moves to the next measuring point from the current measuring point obtained by the obtaining unit 410, and calculates the air inflation rate at which the inflator 500 inflates the corresponding pneumatic ball 300 according to the required air inflation amount and the required time.

Step S330, outputting a detecting signal when the measuring head 200 begins to move towards the next measuring point. In the embodiment, the detecting unit 420 of the controlling device 400 detects the state of the measuring head 200 and outputs the detecting signal when the measuring head 200 begins to move towards the next measuring point from the current measuring point. In the embodiment, the detecting signal can be a signal which can be easily recognized by other components such as a low-level signal or an infrared signal.

Step S340, turning on the inflator 500 after receiving the detecting signal such that the inflator 500 can inflate the corresponding pneumatic ball 300 at the air inflation rate, beginning to accumulate time at the same time, and outputting a controlling signal when the accumulated time reaches the required time. In the embodiment, the controlling unit 440 turns on the inflator 500 after receiving the detecting signal output from the detecting unit 420 such that the inflator 500 can inflate the corresponding pneumatic ball 300 at the air inflation rate. The timing unit 430 of the controlling device 400 receives the time required for the measuring head 200 to move to the next measuring point from the current measuring point and sets the required time as the target time interval. The timing unit 430 begins to accumulate time after receiving the detecting signal, and stops accumulating time if the accumulated time reaches the target time interval and outputs the controlling signal in response.

Step S350, controlling the inflator 500 to stop inflating the corresponding pneumatic ball 300 after receiving the controlling signal. In the embodiment, after receiving the controlling signal output from timing unit 415, the controlling unit 440 turns off the inflator 500, so that the inflator stops inflating the corresponding pneumatic ball 300.

In another embodiment, a sensor (not shown in the drawing) is configured in each pneumatic ball for detecting the air amount in the corresponding pneumatic ball. Specifically, in the embodiment, the step S300 includes the following steps:

Step S310, obtaining the position of the current measuring point where the measuring head is located, obtaining a time required for the measuring head 200 to move to the next measuring point from the current measuring point according to the moving speed of the measuring head 200 and the distance between the current measuring point and the next measuring point, and obtaining the air inflation amount required to be inflated into the corresponding pneumatic ball 300 for keeping the platform 100 horizontal when the measuring head 200 is located at the next measuring point.

Step S320, calculating an air inflation rate at which the inflator 500 inflates the corresponding pneumatic ball 300 according to the required air inflation amount and the required time. In the embodiment, the calculating unit 415 of the controlling device 400 receives the air inflation amount required to be inflated into the corresponding pneumatic ball 300 and the time required for the measuring head 200 to move to the next measuring point from the current measuring point obtained by the obtaining unit 410. The calculating unit 415 further calculates the air inflation rate at which the inflator 500 inflates the corresponding pneumatic ball 300 according to the required air inflation amount and the required time.

Step S330, outputting a detecting signal when the measuring head 200 begins to move towards the next measuring point from the current measuring point.

Step S340, turning on the inflator 500 after receiving the detecting signal such that the inflator 500 can inflate the corresponding pneumatic ball 300 at the air inflation rate. In the embodiment, the controlling unit 440 of the controlling device 400 turns on the inflator 500 after receiving the detecting signal output from the detecting unit 420 such that the inflator 500 can inflate the corresponding pneumatic ball at the air inflation rate.

Step S350, detecting the air amount in the corresponding pneumatic ball 300 and outputting a stop signal when the air amount reaches the required air inflation amount. In the embodiment, the sensor configured in each pneumatic ball 300 detects the air amount in the corresponding pneumatic ball 300 and outputs the stop signal when the air amount reaches the required air inflation amount.

Step S360, controlling the inflator 500 to stop inflating the pneumatic ball 300 after receiving the stop signal. After receiving the stop signal, the controlling unit 440 turns off the inflator 500, so that the inflator 500 stops inflating the corresponding pneumatic ball 300. It is understood that if the detecting signal is a low-level signal, the stop signal can be a high-level signal. Therefore, the controlling unit 440 begins to turn on the inflator 500 after receiving a low-level signal and turns off the inflator 500 after receiving a high-level signal.

In the controlling method of the measuring apparatus provided in the present disclosure, the controlling device is capable of obtaining the time required for the measuring head to move to the next measuring point from the current measuring point and controlling the inflator to inflate the corresponding pneumatic ball with the required air inflation amount within the required time evenly, thus, the inflator can inflate the corresponding pneumatic ball during the movement of the measuring head. This reduces the vibration of the platform occurred while the measuring head is moving and the pneumatic ball is being inflated, keeps the platform horizontal quickly after the measuring head stops moving, reduce the measurement errors of the measuring head, and further improves the productivity of the liquid crystal panel.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A measuring apparatus, comprising:
a platform;
a measuring head movably arranged on the platform;
a plurality of pneumatic balls configured for supporting the platform;
an inflator; and
a controlling device configured for controlling the inflator to inflate a corresponding pneumatic ball while the measuring head is moving towards a next measuring point from a current measuring point;
wherein the controlling device comprises an obtaining unit configured for obtaining an air inflation amount required to be inflated into the corresponding pneumatic ball after the measuring head moves to the next measuring point and obtaining a time required for the measuring head to move to the next measuring point from the current measuring point according to a moving speed of the measuring point and a distance between the current measuring point and the next measuring point.

2. The measuring apparatus as claimed in claim 1, wherein the controlling device further comprises a controlling unit for controlling the inflator to inflate the corresponding pneumatic ball evenly with the required air inflation amount within the required time.

3. The measuring apparatus as claimed in claim 2, wherein the controlling device further comprises a detecting unit and a timing unit, the detecting unit is connected to the measuring head and the controlling unit for outputting a detecting signal when the measuring head begins to move towards the next measuring point from the current measuring point; the timing unit is connected to the detecting unit, the pneumatic balls, and the controlling unit for accumulating time after receiving the detecting signal and for outputting a controlling signal when the accumulated time reaches the required time; the controlling unit controls the inflator to inflate the corresponding pneumatic ball after receiving the detecting signal and controls the inflator to stop inflating the corresponding pneumatic ball after receiving the controlling signal.

4. The measuring apparatus as claimed in claim 3, wherein the controlling device further comprises a calculating unit configured for calculating an air inflation rate at which the inflator inflates the corresponding pneumatic ball according to the required time and the required air inflation amount, and the controlling unit controls the inflator to inflate the corresponding pneumatic ball at the air inflation rate after receiving the detecting signal.

5. The measuring apparatus as claimed in claim 1, wherein a sensor connected to the obtaining unit is arranged in each pneumatic ball, the sensor is used for detecting an air amount in the corresponding pneumatic ball and outputting a stop signal when the air amount in the corresponding pneumatic ball reaches the required air inflation amount; the controlling device comprises a detecting unit, a calculating unit, and a controlling unit; the detecting unit is connected to the measuring head and the controlling unit for outputting a detecting signal when the measuring head begins to move towards the next measuring point from the current measuring point, the calculating unit is configured for calculating an air inflation rate at which the inflator inflates the corresponding pneumatic ball according to the required air inflation amount and the required time, the controlling unit is connected to the inflator and the sensor for controlling the inflator to inflate the corresponding pneumatic ball at the air inflation rate after receiving the detecting signal and controlling the inflator to stop inflating the corresponding pneumatic ball after receiving the stop signal.

6. A controlling method of a measuring apparatus which comprises a platform, a measuring head movably arranged on the platform, and a plurality of pneumatic balls for supporting the platform, comprising:
moving the measuring head such that the measuring head can move from a current measuring point towards a next measuring point; and
controlling an inflator to inflate the corresponding pneumatic ball during the movement of the measuring head;
wherein the step of controlling an inflator to inflate the corresponding pneumatic ball during the movement of the measuring head comprises:
obtaining an air inflation amount required to be inflated into the corresponding pneumatic ball;
obtaining a position of the current measuring point and obtaining a time required for the measuring point to move to the next measuring point from the current measuring point according to a moving speed of the measuring head and a distance between the current measuring point and the next measuring point; and
controlling the inflator to inflate the corresponding pneumatic ball with the required air inflation amount within the required time.

7. The controlling method as claimed in claim 6, wherein the step of controlling the inflator to inflate the corresponding pneumatic ball according to the required air inflation amount and the required time comprises:
outputting a detecting signal when the measuring head begins to move towards the next measuring point from the current measuring point;
calculating an air inflation rate at which the inflator inflates the corresponding pneumatic ball according to the required air inflation amount and the required time;
turning on the inflator after receiving the detecting signal such that the inflator can inflate the corresponding pneumatic ball at the air inflation rate;
accumulating time after receiving the detecting signal and outputting a controlling signal after the accumulated time reaches the required time; and
controlling the inflator to stop inflating the corresponding pneumatic ball after receiving the controlling signal.

8. The controlling method as claimed in claim 6, wherein the step of controlling the inflator to inflate the corresponding pneumatic ball according to the required air inflation amount and the required time comprises:
outputting a detecting signal when the measuring head begins to move towards the next measuring point from the current measuring point;
calculating an air inflation rate which the inflator inflates the corresponding pneumatic ball according to the required air inflation amount and the required time;
turning on the inflator after receiving the detecting signal such that the inflator can inflate the corresponding pneumatic ball at the air inflation rate;
controlling a sensor in each pneumatic ball to detect an air amount in the corresponding pneumatic ball and to output a stop signal when the air amount in the corresponding pneumatic ball reaches the required air inflation amount; and
controlling the inflator to stop inflating the corresponding pneumatic ball after receiving the stop signal.

9. A controlling method of a measuring device which comprises a platform, a measuring head movably arranged on the platform, and a plurality of pneumatic balls for supporting the platform, comprising:
moving the measuring head such that the measuring head can move from a current measuring point towards a next measuring point;
obtaining an air inflation amount required to be inflated into the corresponding pneumatic ball;
obtaining a time required for the measuring head to move to the next measuring point from the current measuring point; and
controlling an inflator to inflate the corresponding pneumatic ball with the required air inflation amount within the required time during the movement of the measuring head.

10. The controlling method as claimed in claim 9, wherein the step of controlling an inflator to inflate the corresponding pneumatic ball with the required air inflation amount within the required time during the movement of the measuring head comprises:
outputting a detecting signal when the measuring head begins to move towards the next measuring point from the current measuring point;
turning on the inflator after receiving the detecting signal such that the inflator can inflate the corresponding pneumatic ball and beginning to accumulate time, and outputting a controlling signal when the accumulated time reaches the required time; and
controlling the inflator to stop inflating the corresponding pneumatic ball after receiving the controlling signal.

11. The controlling method as claimed in claim 10 further comprising the following step after the step of outputting a detecting signal when the measuring head begins to move towards the next measuring point from the current measuring point:

calculating the air inflation rate at which the inflator inflates the corresponding pneumatic ball according to the required air inflation amount and the required time;

and the step of turning on the inflator after receiving the detecting sign such that the inflator can inflate the corresponding pneumatic ball is:

turning on the inflator after receiving the detecting signal such that the inflator can inflate the corresponding pneumatic ball at the air inflation rate and beginning to accumulate time and outputting a controlling signal when the accumulated time reaches the required time.

12. The controlling method as claimed in claim 9, wherein the step of controlling an inflator to inflate the corresponding pneumatic ball with the required air inflation amount within the required time during the measuring head moves comprises:

outputting a detecting signal when the measuring head begins to move towards the next measuring point from the current measuring point;

turning on the inflator after receiving the detecting signal such that the inflator can inflate the corresponding pneumatic ball;

controlling a sensor in each pneumatic ball to detect an air amount in the corresponding pneumatic ball and output a stop signal when the air amount in the corresponding pneumatic ball reaches the required air inflation amount; and controlling the inflator to stop inflating the corresponding pneumatic ball after receiving the stop signal.

13. The controlling method as claimed in claim 12 further comprising the following step after the step of outputting a detecting signal when the measuring head begins to move towards the next measuring point from the current measuring point:

calculating an air inflation rate at which the inflator inflates the corresponding pneumatic ball according to the required air inflation amount and the required time;

and the step of turning on the inflator after receiving the detecting signal such that the inflator can inflate the corresponding pneumatic ball is:

turning on the inflator after receiving the detecting signal such that the inflator can inflate the corresponding pneumatic ball at the air inflation rate.

* * * * *